3,105,852
PROCESS FOR THE PREPARATION OF L-(+)-GLUTAMINE

Roger Boissonnas, Bottmingen, Basel-Land, Switzerland, assignor to Sandoz Ltd. (also known as Sandoz A.G.), Basel, Switzerland
No Drawing. Filed May 25, 1959, Ser. No. 815,267
Claims priority, application Switzerland June 6, 1958
7 Claims. (Cl. 260—534)

This invention relates to a process for the preparation of L-(+)-glutamine which makes it possible to obtain on an industrial scale and within good yield pure and optically homogeneous L-(+)-glutamine without forma- It has now been found that the simple addition of carbon disulfide prior to amidation of γ-esters of glutamic acid (Formula II) almost entirely prevents the formation of pyrrolidonecarboxylic acid (Formula III). The diammonium salt of the N-dithiocarboxy-γ-ester of glutamic acid (IV) is first produced, but is not easily isolated in a pure state. This ammonium salt is then converted into the ammonium salt of glutamine-dithiocarbamate (V) by addition of ammonia. These reactions can be effected in anhydrous or aqueous solution and a lower alkanol (e.g. methanol, ethanol, propanol, butanol, etc.) can be used with advantage as solvent. The best results are obtained with a methanolic solution of the L-glutamic acid-γ-methyl ester.

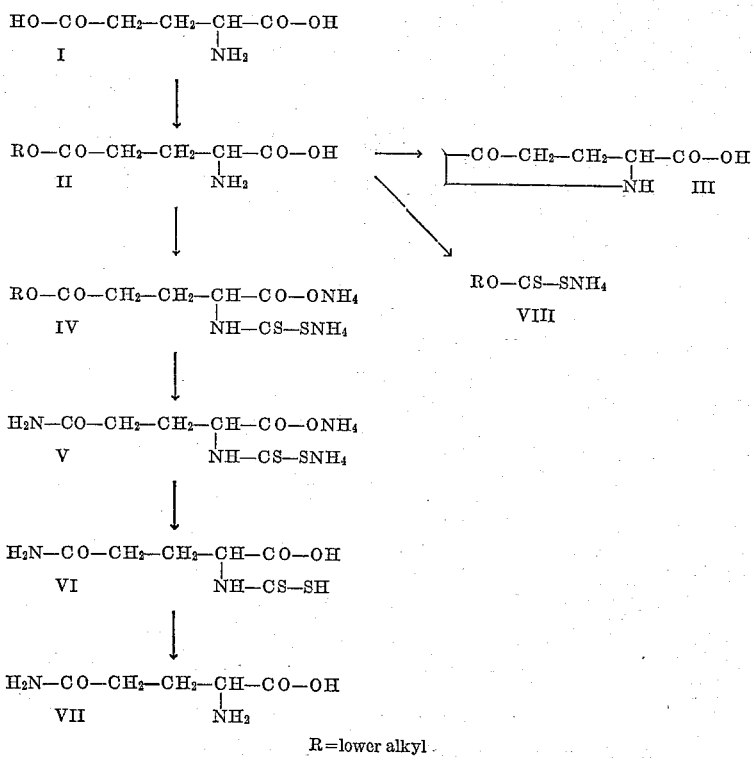

R = lower alkyl tion or splitting off of a racemate. The process is characterized in that a γ-ester of L-glutamic acid is treated with ammonia in the presence of carbon disulfide. L-(+)-glutamine is freed from the reaction product by slightly acidifying.

L-(+)-glutamine (Formula VII) is an important, naturally occurring amino acid. Unlike other amino acids, for example methionine, lysine and L-glutamic acid, its scientific or technical application has hitherto been greatly limited because of its high price. The high price is a direct result of the currently employed processes for its preparation. These involve a number of complicated and uneconomic operations. There is thus a real need for a simpler, less expensive process for industrial-scale synthesis of L-(+)-glutamine.

Attempts have already been made, but without success, to convert the readily available γ-esters of L-glutamic acid (Formula II) directly into amides. Such methods, however, always yield a preponderance of pyrrolidonecarboxylic acid (Formula III) [A. F. Beecham, J. Am. Chem. Soc. 76, 4615 (1954)]. Introduction and subsequent splitting off of groups for protection of the amino group has hitherto been economically unacceptable, rendering the synthesis of L-(+)-glutamine too expensive.

The stability of the dithiocarbamoyl group in strongly basic solution is wholly unexpected. Another remarkable and unexpected feature is that the diammonium salt (IV) is formed much quicker than the xanthogenate (VIII) and that the equilibrium does not shift in favor of the formation of the ammonium salts of the pyrrolidonecarboxylic acid (III) and the xanthogenic acid (VIII), as the reaction proceeds.

Upon completion of the amidation, the excess of ammonia is removed and the reaction mixture is rendered slightly acid by addition of an acid, preferably acetic acid. The free acid of the dithiocarboxy-glutamine (VI) is first formed and then splits spontaneously to give carbon disulfide and L-(+)-glutamine (VII). L-(+)-glutamine, isolated in good yield, shows the same optical activity and possesses exactly the same properties as naturally occurring glutamine. It can be used as a component for artificial culture media and as medicament.

That the synthesis can be so readily accomplished without racemization is rather remarkable, for it is known, that L-glutamic acid and its derivatives easily racemize; and this process has a particular advantage in that it does not require the resolution of a racemic mixture of intermediates into the active components.

The aforedescribed process may be modified as follows: L-glutamic acid is used as starting material and converted by partial esterification to a γ-ester of L-glutamic acid, which is worked up immediately without previous purification or isolation, by adding ammonia in the presence of carbon disulfide.

In the following examples, which illustrate the process of the invention but are not intended to limit the scope of the invention, all temperatures are given in degrees centigrade.

*Example 1*

1000 grams of L-glutamic acid-γ-methyl ester are suspended in a mixture of 500 milliliters of carbon disulfide and 5 liters of methanol at 0° and a current of $NH_3$ is passed into saturation with cooling. The ester dissolves in a few minute. The reaction vessel is closed and the mixture is allowed to stand for 3 to 5 days at 20°; it is then filtered and the excess ammonia is removed under reduced pressure at a temperature not exceeding 35°. After acidifying with 4 liters of 4 N aqueous acetic acid, the solution is warmed at 60° for 30 minutes and the carbon disulfide which separates out is distilled off. The solution is cooled and enough methanol is added to raise the content of methanol to 70 vol. percent. The solution is cooled to —5° for 2 hours and L-(+)-glutamine which crystallizes out is filtered off and washed with methanol and ether. For recrystallization the L-(+)-glutamine is rapidly dissolved in 3.5 liters of boiling water, 7 liters of methanol are added, and the solution is cooled to —5° for 2 hours. In this way 650 grams of pure L-(+)-glutamine, M.P. 187° (with decomposition), and $[\alpha]_D^{20} = +32°$ (c.=3; HCl 1 N), are obtained.

*Example 2*

1000 grams of L-glutamic acid are dissolved in a solution of 500 milliliters of 96 percent sulfuric acid and 10 liters of methanol at 10° and the solution is left for 4 hours at 20°. While cooling strongly, there is passed in a current of ammonia at 0° until neutralization is effected. 500 milliliters of carbon disulfide are then added and more ammonia is passed in to saturation. After allowing to stand at 20° for 3 to 5 days in a closed container, the excess of ammonia is removed under reduced pressure and filtration is effected. After acidification of the filtrate with aqueous acetic acid, the further procedure described in Example 1 is followed. Yield and properties of the end product are the same as described in Example 1.

*Example 3*

1000 grams of L-glutamic acid are dissolved in a solution of 400 grams of anhydrous hydrogen chloride in 10 liters of methanol at 10° and after 5 hours at 20° the so-obtained methanolic solution of L-glutamic acid-γ-methyl ester is worked up in the manner described in Example 2.

In the foregoing examples, other lower alkyl-γ-esters (e.g. the ethyl, propyl or butyl, etc. ester) may be used in lieu of the methyl ester.

What is claimed is:

1. A process for the preparation of L-(+)-glutamine comprising
   (a) reacting, with cooling to about 0° C., a lower alkyl-γ-ester of L-glutamic acid with ammonia and carbon disulfide, in a solvent selected from the group consisting of water and a lower alkanol,
   (b) maintaining the resultant solution for 3 to 5 days at about 20° C.,
   (c) acidifying the resultant solution of amidified diammonium salt of the N-dithiocarboxy-γ-ester of glutamic acid of the formula

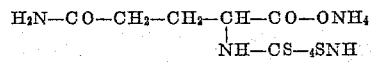

sufficiently to free L-(+)-glutamine therefrom, and
   (d) separating the free L-(+)-glutamine from the reaction mixture.

2. A process according to claim 1, wherein the γ-ester of the L-glutamic acid is 1-glutamic acid-γ-methyl ester.

3. A process according to claim 1, wherein the γ-ester of L-glutamic acid is produced in the reaction solution itself by esterification of glutamic acid with a lower alkanol, and wherein the resulting γ-ester of L-glutamic acid is reacted with ammonia in the presence of carbon disulfide without prior isolation and purification.

4. A process according to claim 3, wherein the alkanol added is methanol and the γ-ester of L-glutamic acid produced in the reaction mixture in L-glutamic acid-γ-methyl ester.

5. Process according to claim 1, wherein the reaction is effected in a lower alkanol as the solvent.

6. A process according to claim 5, wherein the alkanol is methanol.

7. A process for the preparation of L-(+)-glutamine, comprising mixing with cooling to about 0° C. L-glutamic acid-γ-lower alkyl ester with carbon disulfide and a lower alkanol and passing a current of ammonia into the mixture to saturation, separating excess ammonia therefrom at a temperature of up to 35° C., acidifying the resulting ammonia-free mixture, distilling off carbon disulfide, and crystallizing L-(+)-glutamine from the mixture.

References Cited in the file of this patent

UNITED STATES PATENTS

| | | |
|---|---|---|
| 2,762,841 | Vassel | Sept. 11, 1956 |
| 2,768,966 | Vassel | Oct. 30, 1956 |
| 2,883,399 | Amiard | Apr. 21, 1959 |

OTHER REFERENCES

Karrer: "Organic Chemistry," page 132 (1950).